United States Patent [11] 3,625,308

| [72] | Inventor | Kurt M. Gebel |
| | | Waynesboro, Pa. |
| [21] | Appl. No. | 851,890 |
| [22] | Filed | Aug. 21, 1969 |
| [45] | Patented | Dec. 7, 1971 |
| [73] | Assignee | Litton Industries, Inc. |
| | | Beverly Hills, Calif. |

[54] SPINDLE LUBRICATION SAFETY DEVICE
11 Claims, 3 Drawing Figs.

[52] U.S. Cl. ..................................... 184/6.1,
184/6.3, 184/6.4
[51] Int. Cl. ..................................... F16n 29/00
[50] Field of Search ........................... 184/6, 6 A,
6 C, 6 D; 308/1.5

[56] References Cited
UNITED STATES PATENTS

| 1,209,553 | 12/1916 | Campbell | 308/1 A |
| 1,132,791 | 3/1915 | Pagano | 184/6 X |
| 2,143,533 | 1/1939 | Archea et al. | 184/6 |
| 2,245,378 | 6/1941 | Arms | 184/6 UX |
| 2,502,318 | 3/1950 | Fischer | 184/6 |
| 2,606,081 | 8/1952 | Moller | 184/6 X |
| 2,673,621 | 3/1954 | Puerta | 184/6 |
| 3,048,158 | 8/1962 | Olson | 184/6 X |

Primary Examiner—Manuel A. Antonakas
Attorney—Diller, Brown, Ramik & Holt

ABSTRACT: Lubrication of spindle bearings, and more particularly to safety means for preventing the starting of the spindle drive motor before there is assurance of adequate lubrication for the spindle bearings. It is necessary that lubricant in the spindle housing be adequate before the spindle drive motor can start. This is accomplished by providing a pressure chamber in which the rise in lubricant level confines a small volume of air. When the lubricant level rises to a predetermined point, the air is subjected to compression sufficient to actuate a pressure switch in the circuit to the spindle drive motor. The compression chamber may either be part of an external lubricating system, or may be an integral part of the spindle housing. When the machine of which the spindle is a part is stopped, lubricant drains out of the spindle housing and the lubricant level within the compression chamber is reduced to permit the pressure switch to open.

INVENTOR
KURT M. GEBEL
ATTORNEYS

INVENTOR
KURT M. GEBEL
BY
Diller, Brown, Ramik & Wight
ATTORNEYS

SPINDLE LUBRICATION SAFETY DEVICE

This invention relates in general to lubricating means for spindle bearings, and more particularly the spindle bearings of machine tools. The invention particularly relates to a lubrication safety device which prevents starting a spindle drive motor unless there is an adequate supply of lubricating oil available in the spindle bearings.

Prior to this invention, the conventional device for delaying the start of a spindle drive motor was in the form of a pressure switch in a lubricating line leading to the spindle bearing. Such devices merely indicate that the lubricating pump is in operation and there is pressure in the line leading to the bearings or spindle compartment. However, the prior devices do not indicate that there is an inadequate supply of lubricant within the bearings. For example, the lubricant line can be restricted and while there is adequate pressure, there is not adequate volume of lubricant flow.

The amount of lubricating oil flowing through a bearing can be determined by the amount of oil being discharged from the bearing. This determination may be made by oil level rise in a compartment remote from the machine or within a compression compartment built into a housing for the bearing.

In view of the foregoing, it is, therefore, an object of this invention to provide means for preventing the operation of a spindle drive motor unless an adequate supply of lubricant is flowing within bearings for the spindle.

Another object of this invention is to control the operation of a spindle drive motor by utilizing compressed air or other gases which is pressurized in accordance with the degree of exhaust lubricant flow when there is sufficient continuous flow of lubricant from bearings to produce the necessary pressure.

Another object of the invention is to provide means which indicate the presence of flowing lubricant in the bearings, which means is arranged to start a spindle drive motor through a switch member.

Yet another object of this invention is to provide means to immediately stop rotation of a spindle drive motor should the flow of lubricant through the spindle become inadequate, to prevent the spindle from being damaged.

The primary feature of this invention is the provision of means to prevent the operation of a spindle drive motor unless there is an adequate supply of lubricant flowing through bearings for the spindle. This is accomplished by utilizing the rise of lubricating oil within a pressure chamber apart from the spindle housing. The pressure chamber uses the discharge oil from the spindle housing to compress air within a diving bell or like unit in a small hydraulic reservoir, to operate a pressure switch in the circuit controlling the operation of the spindle drive motor. If desired, the chamber may be a compartment of a divided or double compartment vessel, which arrangement will permit additional safety factors and provide an adjustable timed system by regulating the controlled flow between the compartments. If desired, the compression chamber may be built as an integral part of the spindle housing to operate a pressure switch in the circuit for the spindle drive motor in a like manner, when the oil level within the compression chamber rises to confine a small volume of air and pressurize the same.

It is particularly pointed out here that the area or size of the compression chamber is relatively unimportant as it is the rise in the oil level which results in the compression of the gas and not the volume of the oil or other lubricant available. There must, however, be a sufficiently large volume of oil within a compression chamber to actuate a pressure switch. The large area, however, additionally provides a safety factor which prevents loss of air entrainment or absorption of air by the lubricant being a factor.

With the above and other objects in view that will hereinafter appear, the nature of the invention will be more clearly understood by reference to the following detailed description, the appended claims and the several views illustrated in the accompanying drawings:

Figure 1:
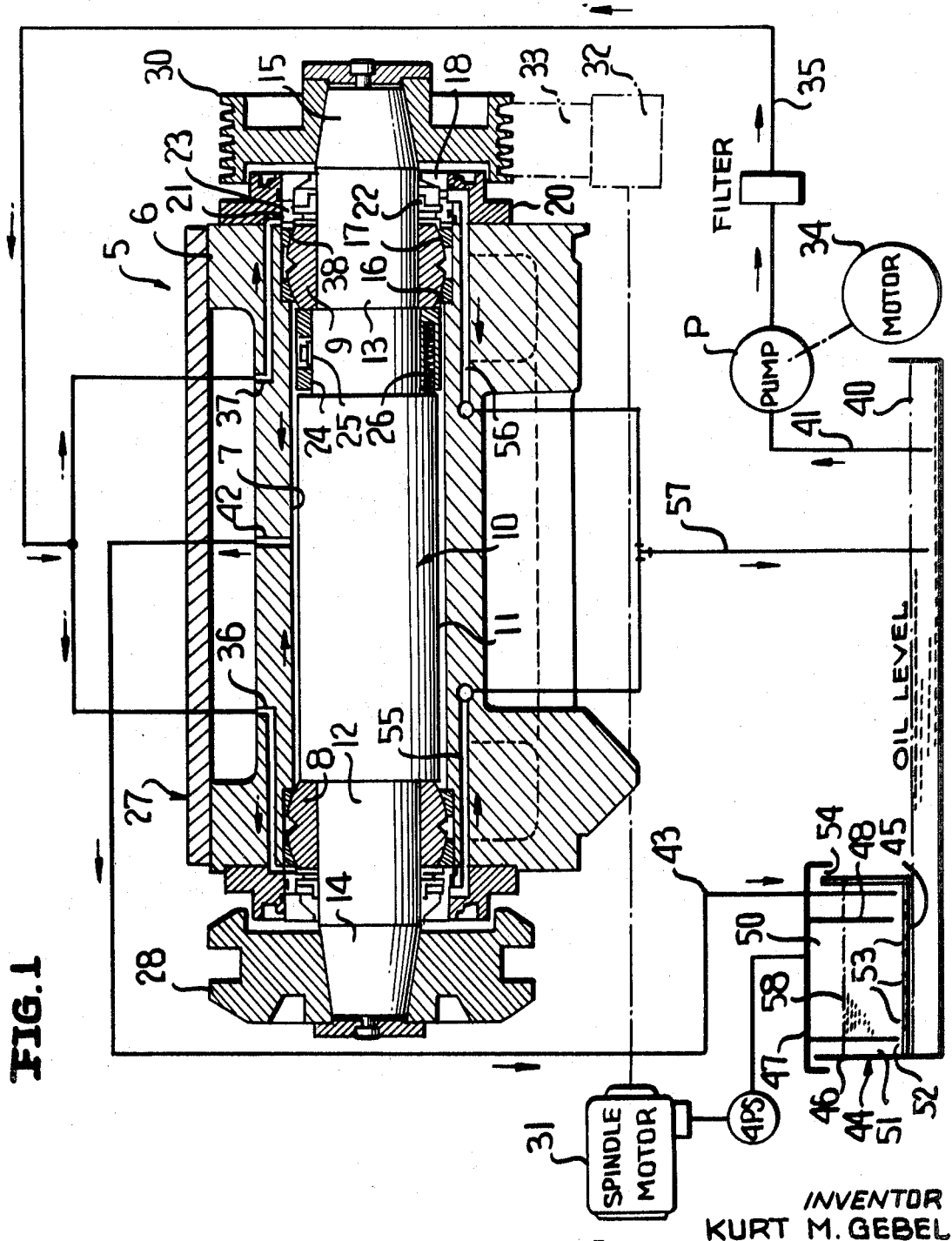
FIG. 1 is a schematic longitudinal sectional view through a typical spindle installation and shows means for lubricating the spindle bearings and a lubrication safety device for controlling the operation of the spindle motor in accordance with this invention.

Referring now to the drawings in detail, reference is first made to FIG. 1 wherein there is illustrated a typical spindle assembly which is lubricated in accordance with this invention. The spindle assembly, which is identified by the numeral 5, basically includes a housing 6 having an axial bore 7 therethrough. The bore 7 is provided with enlargements at the opposite ends thereof receiving typical bearings 8 and 9. The bearings 8 and 9, in turn, support a spindle which is generally identified by the numeral 10.

It is to be noted that the spindle 10 includes a central portion 11 which is of a diameter approaching the diameter of the bore 7 with space therebetween to permit oil to surround the central portion 11 of the spindle 10. The spindle 10 also has reduced diameter end portions 12 and 13, respectively, which are rotatably journaled within the bearings 8 and 9, respectively. The end portion 12 terminates in a tapered mounting portion 14 while the end portion 13 terminates in a tapered mounting portion 15.

Each of the bearings 8 and 9 is supported in axially adjustable retaining rings 16 and 17, and is positioned longitudinally within the housing 6 by means of a bearing adjusting nut 18. Each bearing adjusting nut 18 is in threaded engagement with a clamp nut ring 20 which is secured to an adjusting side of the housing 6 and the bearings 8 and 9 are sealed by means of rings 21 and 22 and an O-ring 23 with the rings 21 and 22 being held against a respective ring 17 to position the respective one of the bearings 8 and 9.

It is also to be noted that a thrust collar 24 is secured to the spindle 10 to the left of the end portion 13 by means of a screw 25 for limited axial movement relative to the spindle 10. The thrust collar 24 is provided with a plurality of circumferentially spaced springs 26 which provides a thrust against the shoulder of the bearing 8 and provides means to adjust the bearing 9.

At this time it is pointed out that the housing 6 is illustrated as being in the form of a wheelhead for a grinder, the wheelhead being identified by the numeral 27. The spindle 10 has mounted on the left end thereof a support assembly 28 for a grinding wheel and on the right end thereof a drive pulley 30. The spindle 10 is driven by means of a spindle motor 31 in a conventional manner which is schematically illustrated to include a drive pulley 32 and drive belt means 33.

Lubrication is provided to the bearings 8 and 9 in a conventional manner by a pump P which is driven by a motor 34. Lubricant is directed through a line 35 from the pump P into passages 36 and 37 in the wheelhead 27 with the lubricant being pumped under pressure to the bearings 8 and 9 through passages 38 in the rings 21.

It is to be noted that lubricant supplied to the bearings 8 and 9 floods these bearings and flows toward the center of the housing 6 so as to flood the housing bore 7 with lubricant surrounding the central portion 11 of the spindle 10.

Lubricant is stored within a reservoir 40 and is directed to the pump P through a line 41. Lubricant from within the housing bore 7 is discharged through a passage 42 and is directed back to the reservoir 40 through a return line 43.

The lubricant is not returned directly to the reservoir 40, but is delivered to a vessel, which is generally identified by the numeral 44. The vessel 44 has a bottom wall 45 which is positioned above the normal oil level within the reservoir 40.

The vessel 44 also includes an upstanding peripheral wall 46, which may be a portion of the wall of the reservoir 40, and a cover 47. In addition, the vessel 44 is preferably provided with an internal baffle 48 so as to define an inner compression chamber 50 and a surrounding chamber 51. The lower portions of the chambers 50 and 51 are in communication with one another through suitable openings 52 formed between the baffle 48 and the bottom wall of the chamber 51 to permit free flow of lubricant between the chambers 50 and 51.

It is also to be noted that the bottom wall 45 is provided with selected orifices 53 so as to permit the draining of the vessel 44 into the reservoir 40. Furthermore, it is provided with an overflow outlet 54.

It is to be noted that the return line 43 directs returning lubricant into the vessel 44 in the compartment 51 thereof. The lubricant flows through the openings 52 into the chamber 50 while other of the lubricant flows out through the orifices 53 into the reservoir 40. The total area of the orifices 53 permits approximately one-half of the total output of the pump P to be drained into the reservoir 40 therethrough. As a result, there is a gradual buildup of lubricant within the vessel 44 with air being entrapped within the compression chamber 50 and being gradually compressed as the level of the lubricant rises therein. When the pressure of the entrapped air or other gas within the compression chamber 50 becomes sufficient, it will close a pressure switch 4PS so as to effect the energization of the spindle motor 31.

It will be readily apparent that by varying the total area of the orifices 53, one can control the rate of oil level rise within the compression chamber 50 and thus control the time required for normal lubricant flow to effect the closing of the pressure switch 4PS in the actuation of the spindle motor 31.

It is to be understood that returning lubricant will continue to flow into the vessel 44 even after the pressure switch 4PS has been actuated and while the entrapped air in the compression chamber 50 will limit the final level of lubricant therein, lubricant will continue to rise in the chamber 51 and then flow out through the overflow 54 into the reservoir 40.

It is also pointed out that any lubricant which leaks past the rings 21 and 22 and the O-rings 23 is drained through passages 55 and 56 to a return line 57 which drains into the reservoir 40.

OPERATION

It is to be understood that the spindle assembly illustrated in FIG. 1 and the lubricant supply system therefor is conventional with the exception of the vessel 44 and the pressure switch 4PS which constitute the lubrication safety device of this invention.

Figure 3:
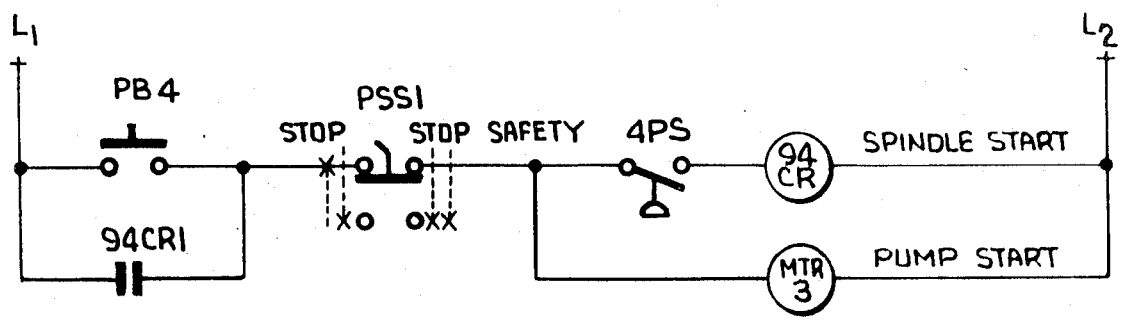
FIG. 3 is a partial wiring schematic diagram showing a typical circuit for the lubrication safety device.

With particular reference to FIG. 3, it will be seen that pushbutton switch PB4 must be closed in order to effect rotation of the spindle 10. When pushbutton switch PB4 is closed, it will complete a circuit through normally closed pushbutton selector switch PSS1 to energize pump start relay MTR3. Pump P directs lubricant from reservoir 40 through line 35 to passages 36 and 37 in the wheelhead 27 to lubricate the bearings 8 and 9 and to flood the housing bore 7 with lubricant. The flowing lubricant is directed out of the housing 6 through the passage 42 into the return line 43 which, in turn, delivers the returning lubricant to the vessel 44. After a predetermined limited lapse of time, the returning lubricant will build up to an approximate level 58 within the compression chamber 50 sufficiently to effect the closing of pressure switch 4PS.

The closing of pressure switch 4PS energizes spindle start relay 94CR so as to operate the spindle motor 31 with the result that rotation of the spindle 10 begins. At the same time, contact 94CR1 closes to provide a holding circuit around pushbutton switch PB4 and, therefore, pushbutton switch PB4 may now be released.

Rotation of the spindle 10 continues and lubricant is continuously pumped through the bearings 8 and 9 and out of the overflow opening 54 of the vessel 44 as well as out through the orifices 53 in the bottom wall thereof.

Spindle rotation will continue until pushbutton selector switch PSS1 is opened to deenergize relay MTR3. At the same time, spindle start relay 94CR is deenergized so that both the rotation of the spindle 10 and the operation of the pump P is stopped. When the pump P stops operating, the oil level 58 within the compression chamber 50 drops as the oil flows out through the orifices 53 with the result that pressure switch 4PS opens. The spindle 10 cannot be again driven until there is sufficient lubricant flow to again effect the closing of pressure switch 4PS.

It will be readily apparent that the lubricant system is arranged to stop rotation of the spindle drive motor 31 in the event a leak or blockage should occur which would reduce the oil level 58 within the compression chamber 50 and open the pressure switch 4PS. Thus, at no time will the spindle drive motor 31 operate without there being sufficient lubricant flow to and through the bearings of the spindle.

It is to be understood that since the compression chamber 50 is separated from the wheelhead 27, as is shown in FIG. 1, there will be a delay between the actual supplying of lubricant to the spindle bearings and the actuation of the spindle drive motor 31. Furthermore, this delay will be increased by the time required for lubricant to build up within the compression chamber 50. As indicated above, the total time may be varied by regulating the number of orifices 53 which control the drainage of lubricant from the vessel 44 into the reservoir 40.

Figure 2:
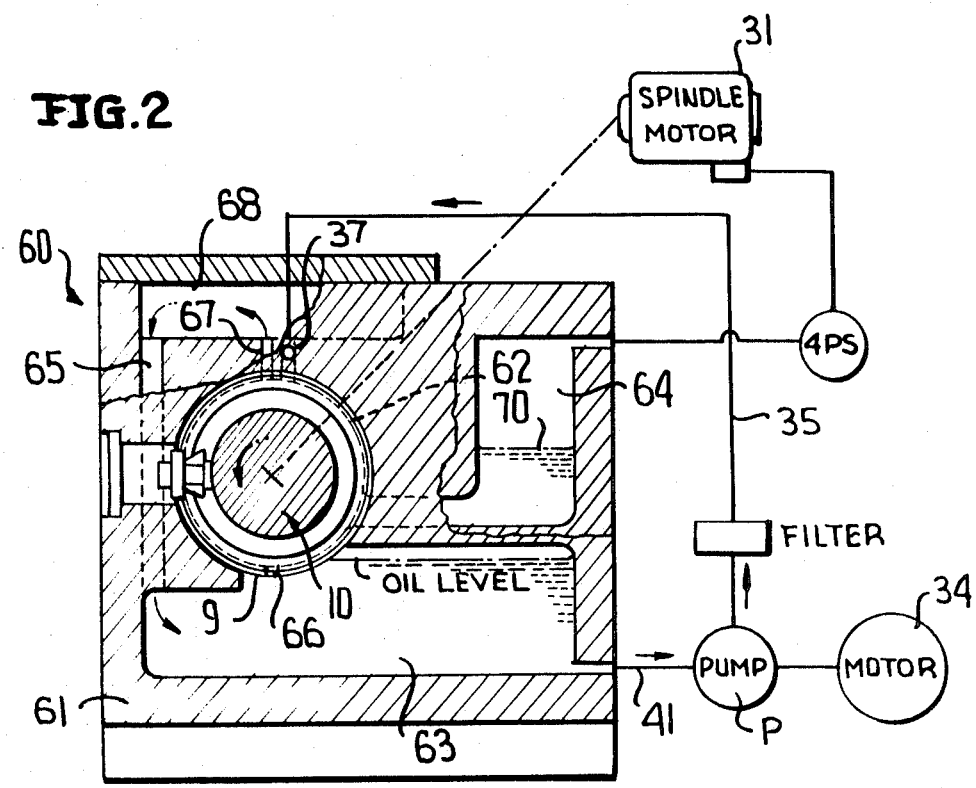
FIG. 2 is a transverse sectional view through a spindle assembly similar to that of FIG. 1 wherein the housing has the compression chamber formed therein.

In FIG. 2 there is illustrated a slightly modified form of wheelhead construction which is generally identified by the numeral 60. The wheelhead 60 includes a housing 61 having the spindle 10 mounted therein in the same manner as that specifically illustrated and described in FIG. 1. The spindle 10 is supported by a pair of bearings 8 and 9 of which only the bearing 9 is shown. It is to be understood that lubricant will be supplied to the spindle 10 and the bearings 8 and 9 adjacent the remote ends of the spindle with the lubricant flowing through the bearings 8 and 9 and then within the bore within the housing 61 receiving the spindle, the bore being identified by the numeral 62.

The wheelhead 60 differs from the wheelhead 27 primarily in that the housing 61 thereof is constructed to include a reservoir 63 and a compression chamber 64, the reservoir 63 and the compression chamber 64 being disposed immediately adjacent the spindle 10.

It is be noted that the pump P, which is driven by pump motor 34, receives lubricant from the reservoir 63 through a pickup line 41 and delivers the same through a supply line 35 to bearings 8 and 9 in the same manner illustrated in FIG. 1. The lubricant flows to the center of the housing 61 into the bore 62 which surrounds the central portion of the spindle 10, and from which lubricant flows into a compression chamber 64.

The bore 62 is also in communication with a reservoir 63 through ports 66 of a controlled size and number.

The compression chamber 64 has the lower portion thereof in communication with the bore 62 so that when the lubrication system is functioning, lubricant flows into the compression chamber 64 until an approximate oil level 70 is reached within the compression chamber 64 which compresses air or other gases entrapped in the upper portion thereof. When the pressure within the compression chamber 64 has built up to the necessary degree to indicate a full flow of lubricant through the bearing and spindle assembly, pressure switch 4PS is closed to actuate the single drive motor 31.

The excess lubricant exits from the bore 62 through a passage 67 into a chamber 68 disposed at the top of the housing 61. The excess lubricant then flows from the chamber 68 through a passage 65 into the reservoir 63.

It is to be understood that when the spindle 10 is not rotating and the pump P is not functioning, lubricant collected within the compression chamber 64 will drain through the ports 66 back into the reservoir 63 so that time will be required for lubricant build up within the compression chamber 64 before the spindle drive motor 31 may again be actuated.

OPERATION

The operation of the spindle lubrication safety device of FIG. 2 is almost identical to that previously described with respect to FIGS. 1 and 3. It is to be understood that the wiring diagram of FIG. 3 applies equally as well to FIG. 2 as it does to FIG. 1.

With respect to FIG. 3, pushbutton switch PB4 is depressed and energizes pump start relay MTR3 with the result that the pump drive motor 34 is actuated and the pump P is operated so as to pump lubricant from the reservoir 63 into the housing 61 so as to lubricate the bearings 8 and 9. When the housing bore 62 becomes flooded, a portion of the returning lubricant flows directly into the compression chamber 64 to compress gas therein. When there has been sufficient excess lubricant flow so as to compress the gas within the compression chamber 64 sufficiently to close the pressure switch 4PS, spindle start relay 94CR will be energized to actuate the spindle drive motor 31 to start the rotation of the spindle 10. The pushbutton switch PB4 may now be released and the circuit is completed through the holding circuit including contact 94CR1.

It is to be understood that after the lubricant builds up to an approximate oil level 70 at a certain point within the compression chamber 64, no further lubricant will enter the compression chamber 64. Thereafter, all lubricant will flow back into the reservoir 63 as long as the pump P is operating and there is proper flow of lubricant through the bearings 8 and 9.

When pushbutton switch PSS1 is moved to the stop position, the relays 94CR and MTR3 are deenergized and contact 94CR1 opens. Rotation of the spindle 10 and operation of the pump P ceases which reduces pressure in the compression chamber 64 and opens pressure switch 4PS. The oil within the compression chamber 64 will then flow back into the reservoir 63 through the ports 66.

It will be readily apparent that with the two forms of the lubricant safety system, in each and every instance, rotation of the spindle cannot begin and rotation will be discontinued unless there is available the necessary supply of lubricant flowing through the bearings so as to provide the necessary lubrication for the bearing and spindle.

Although only preferred embodiments of the invention have been specifically illustrated and described herein, it is to be understood that minor variations may be made in the lubricant safety system without departing from the spirit of the invention.

I claim:

1. A lubrication safety device for a bearing and spindle assembly of the type wherein there is a circulation of lubricant, said lubrication safety device comprising
   a. a source of lubricant coupled to said bearing,
   b. means for receiving lubricant from said bearing,
   c. drive means for effecting relative rotation between said bearing and said spindle, and
   d. control means for controlling the operation of said drive means in response to the presence of lubricant in said bearing.
   e. said means for receiving lubricant including a chamber having a gas entrapped therein,
   f. said chamber having a normal discharge capacity less than the normal flow of lubricant thereinto, whereby during normal lubrication of said bearing and spindle there is an accumulation of lubricant within said chamber compressing the gas entrapped therein, and
   g. said control means being responsive to gas pressure within said chamber.

2. The lubrication safety device of claim 1 wherein said chamber is formed in a housing supporting said bearing.

3. The lubrication safety device of claim 1 wherein
   a. said chamber is separate and apart from the return flow of lubricant, and
   b. receives lubricant only when sufficient lubricant is maintained in said bearing.

4. A lubrication safety device for a bearing and spindle assembly of the type wherein there is a circulation of lubricant, said lubrication safety device comprising
   a. a source of lubricant coupled to said bearing,
   b. means for receiving lubricant from said bearing,
   c. drive means for effecting relative rotation between said bearing and said spindle, and
   d. control means for controlling the operation of said drive means in response to the presence of lubricant in said bearing;
   e. said means for receiving lubricant including a return line,
   f. a chamber receiving returning lubricant,
   g. said chamber having a gas entrapped therein,
   h. said chamber having a normal discharge capacity less than the normal flow of lubricant through said return line whereby said entrapped gas is pressurized by lubricant accumulating in said chamber, and
   i. said control means being responsive to gas pressure within said chamber.

5. The lubrication safety device of claim 4 wherein
   a. means are provided for discharging excess lubricant received from said return line.

6. The lubrication safety device of claim 4 wherein
   a. said chamber is part of a vessel including an inlet compartment,
   b. said inlet compartment has the bottom thereof in communication with said chamber adjacent the bottom thereof, and
   c. said inlet compartment has an upper overflow passage for discharging excess lubricant received from said return line.

7. The lubrication safety device of claim 6 wherein
   a. said vessel has a bottom wall, and
   b. normal discharge from said vessel is through perforations in said bottom wall.

8. The lubrication safety device of claim 4 wherein said chamber is part of a lubricant reservoir system.

9. A lubrication safety device for a bearing and spindle assembly of the type wherein there is a circulation of lubricant under pressure, said lubrication safety device comprising
   a. a source of lubricant under pressure coupled to said bearing,
   b. conduit means for controlling lubricant flow from said bearing,
   c. drive means for effecting relative rotation between said bearing and said spindle, and
   d. control means for controlling the operation of said drive means in accordance with the flow of lubricant from said bearing.

10. A lubrication safety device for a bearing and spindle assembly of the type wherein there is a circulation of lubricant, said lubrication safety device comprising
    a. a source of lubricant coupled to said bearing,
    b. means for receiving lubricant from said bearing,
    c. drive means for effecting relative rotation between said bearing and said spindle,
    d. control means for controlling the operation of said drive means in response to the presence of a predetermined level of lubricant in said bearing,
    e. said means for receiving lubricant includes a reservoir for receiving lubricant from said bearing for recirculation through said bearing,
    f. a chamber other than said reservoir for receiving lubricant from said bearing during the normal lubrication of said bearing and spindle, and
    g. said predetermined level of lubricant is within said chamber.

11. A lubrication safety device for a bearing and spindle assembly of the type wherein there is a circulation of lubricant, said lubrication safety device comprising a. a source of lubricant coupled to said bearing,
b. means for receiving lubricant from said bearing,
c. drive means for effecting relative rotation between said bearing and said spindle,
d. control means for controlling the operation of said drive means in response to the presence of a predetermined level of lubricant in said bearing,
e. said means for receiving lubricant includes a chamber,
f. said chamber having a normal discharge capacity less than the normal flow of lubricant thereinto, whereby during normal lubrication of said bearing and spindle there is an accumulation of lubricant within said chamber, and
g. said predetermined level of lubricant is within said chamber.

* * * * *